(12) United States Patent
Story et al.

(10) Patent No.: US 6,260,092 B1
(45) Date of Patent: Jul. 10, 2001

(54) POINT TO POINT OR RING CONNECTABLE BUS BRIDGE AND AN INTERFACE WITH METHOD FOR ENHANCING LINK PERFORMANCE IN A POINT TO POINT CONNECTABLE BUS BRIDGE SYSTEM USING THE FIBER CHANNEL

(75) Inventors: Franklyn Hayward Story, Chandler; Brian Dale Logsdon, Glendale; David Spaniol, Phoenix, all of AZ (US)

(73) Assignee: Philips Semiconductors, Inc., Tarrytown, NY (US)

( * ) Notice: Subject to any disclaimer, the term of this patent is extended or adjusted under 35 U.S.C. 154(b) by 0 days.

(21) Appl. No.: 09/159,424

(22) Filed: Sep. 24, 1998

(51) Int. Cl.[7] .............................. G06F 13/14; G06F 13/40
(52) U.S. Cl. ........................ 710/128; 710/129; 710/106
(58) Field of Search ................................... 710/104–106, 710/126–132

(56) References Cited

U.S. PATENT DOCUMENTS

| 5,539,846 | * | 7/1996 | Morikura et al. ...................... 385/24 |
| 5,561,806 | * | 10/1996 | Fitchett et al. ........................ 709/250 |
| 5,572,352 | * | 11/1996 | Carbone, Jr. et al. ................ 359/177 |
| 5,748,924 | * | 5/1998 | Llorens et al. ........................ 710/129 |
| 5,809,328 | * | 9/1998 | Nogales et al. ........................... 710/5 |
| 5,812,881 | * | 9/1998 | Ku et al. ................................. 710/71 |
| 5,887,039 | * | 3/1999 | Suemura et al. ..................... 375/365 |
| 5,898,512 | * | 4/1999 | Arai ..................................... 359/110 |
| 5,907,719 | * | 5/1999 | Nimishakavi .......................... 710/71 |
| 5,950,115 | * | 9/1999 | Momtaz et al. ....................... 455/73 |
| 5,970,070 | * | 10/1999 | Ho et al. .............................. 370/462 |
| 5,982,309 | * | 11/1999 | Xi et al. ............................... 341/101 |
| 6,061,360 | * | 5/2000 | Miller et al. .......................... 370/455 |
| 6,064,679 | * | 5/2000 | Hashemi et al. ..................... 370/513 |
| 6,070,200 | * | 5/2000 | Gates et al. ............................ 710/20 |

* cited by examiner

*Primary Examiner*—Sumati Lefkowitz

(57) ABSTRACT

A point-to-point or ring connectable bus bridge replicates a PCI bus serially over a point-to-point or ring connected network and the Fiber Channel interface enhanced by a method for improving link performance provides the serial connection. Participants can appear as resources or masters on the PCI bus and connections can be made to existing bus controllers and existing bus peripherals without redesign.

17 Claims, 6 Drawing Sheets

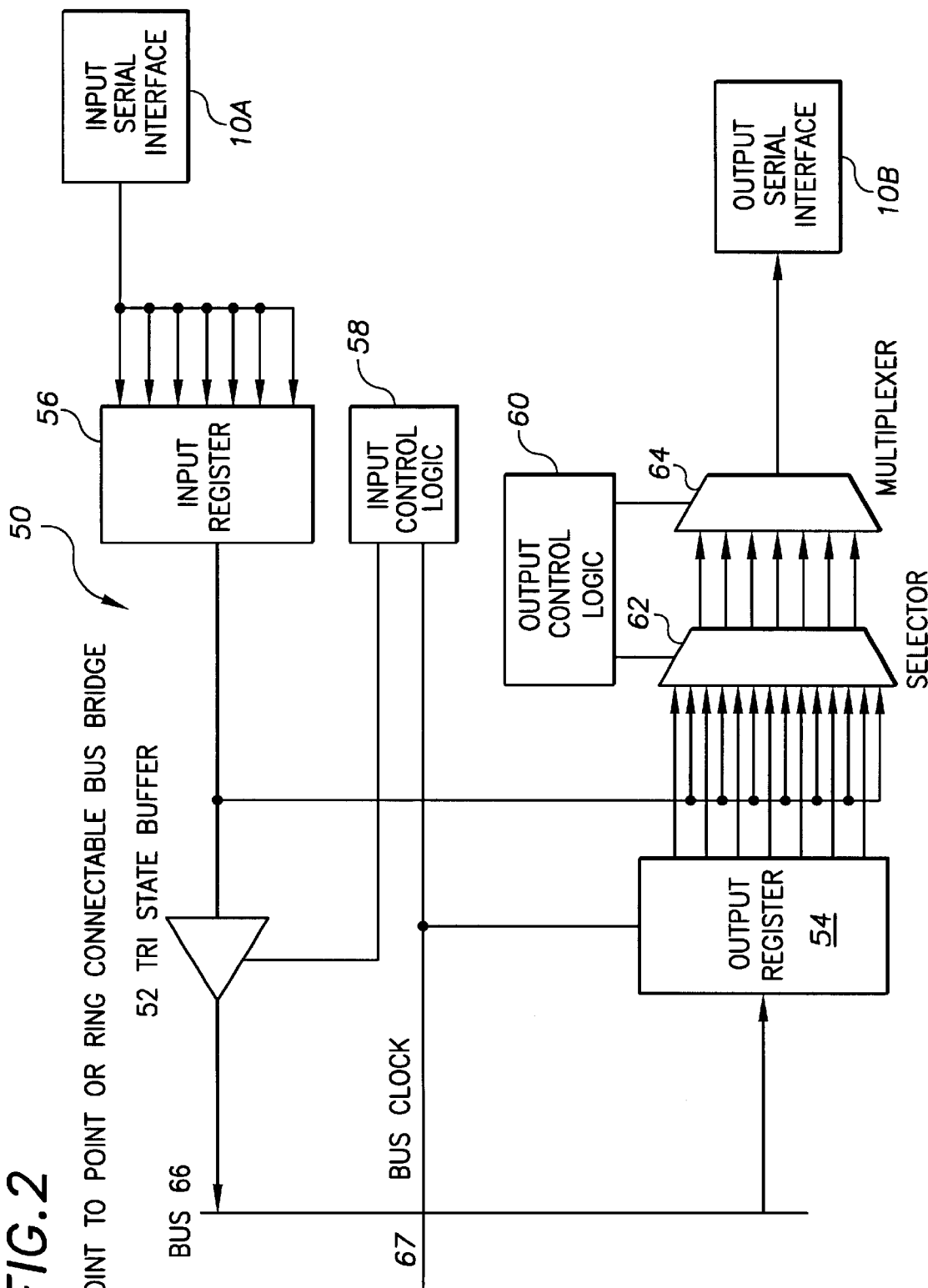

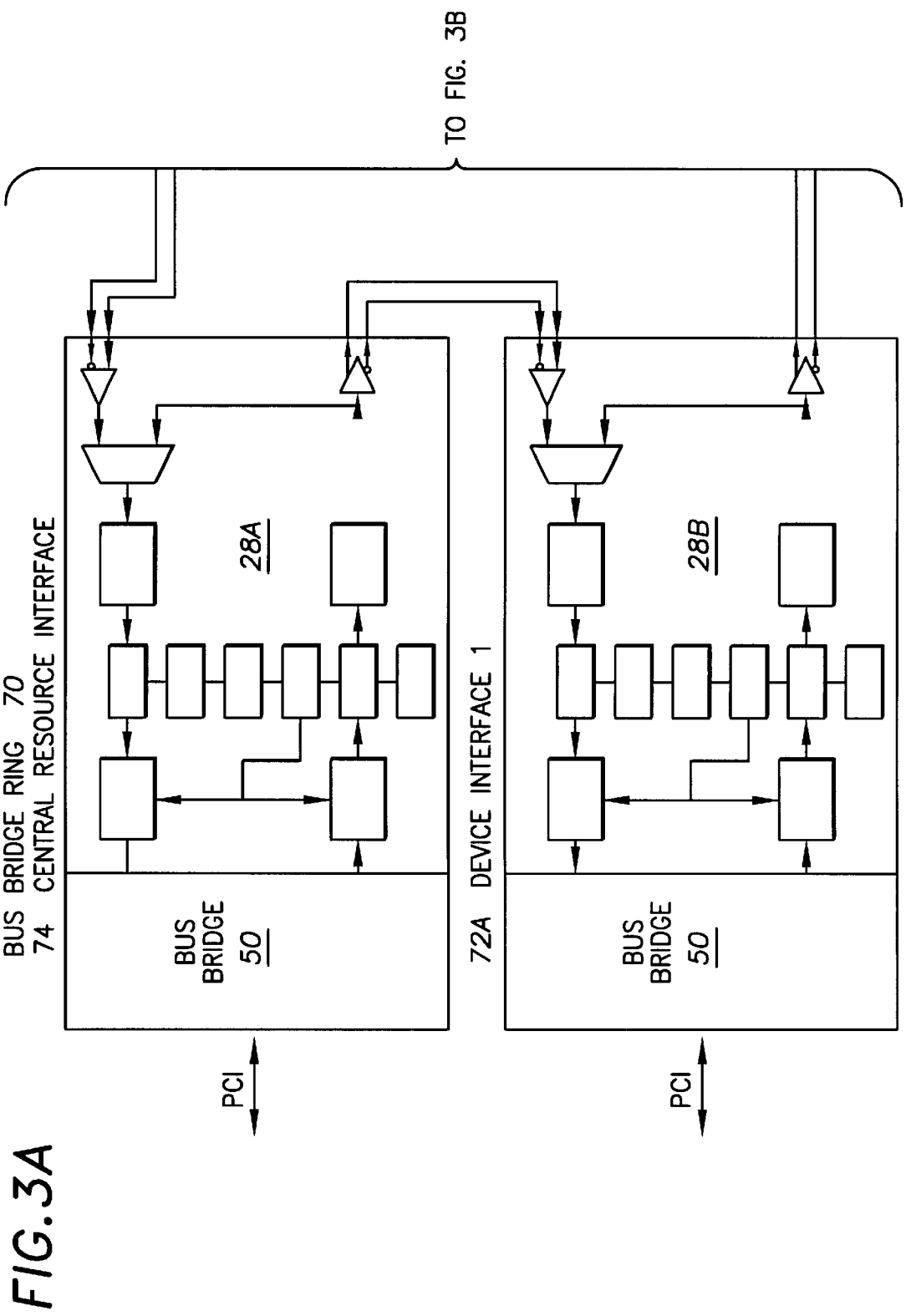

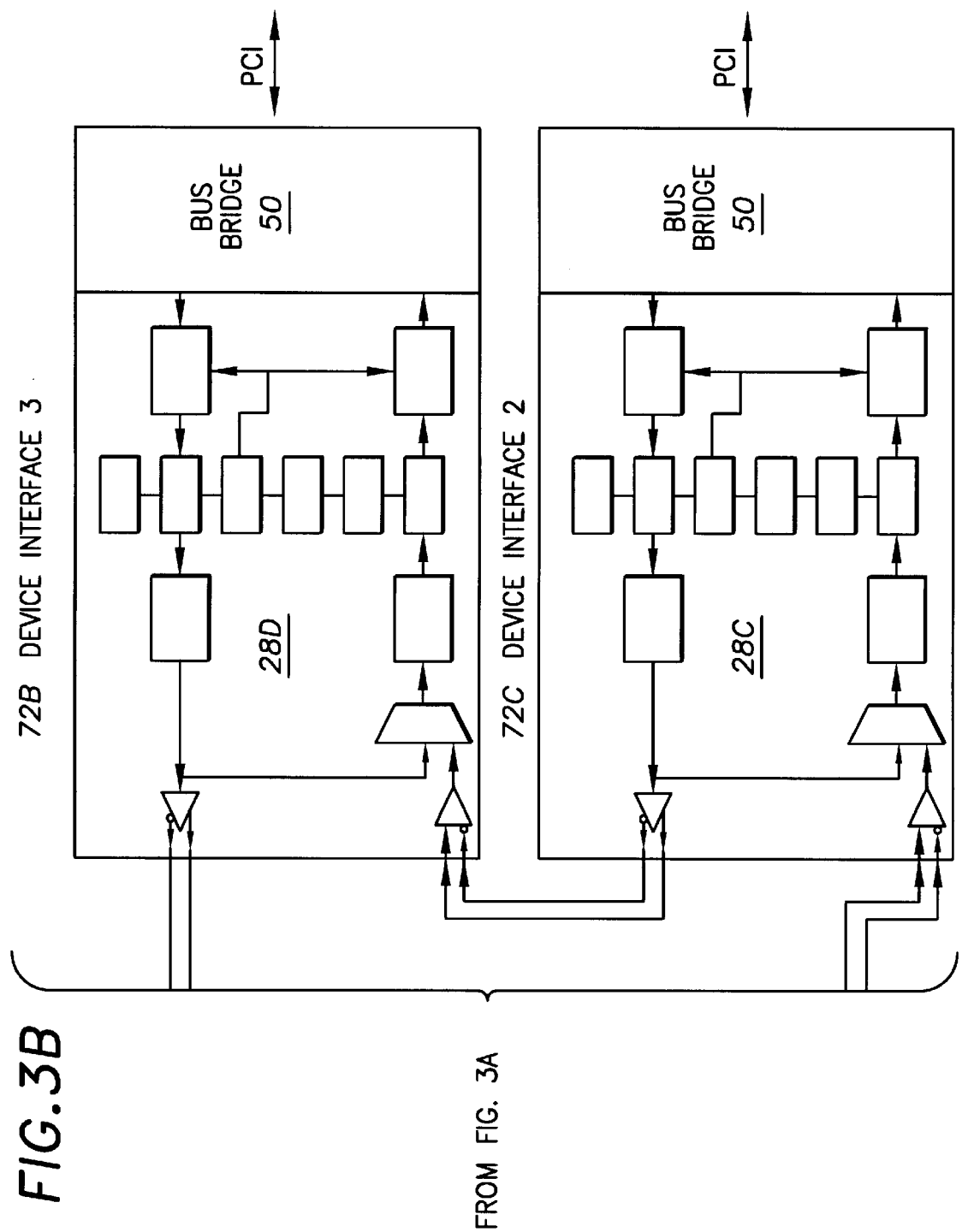

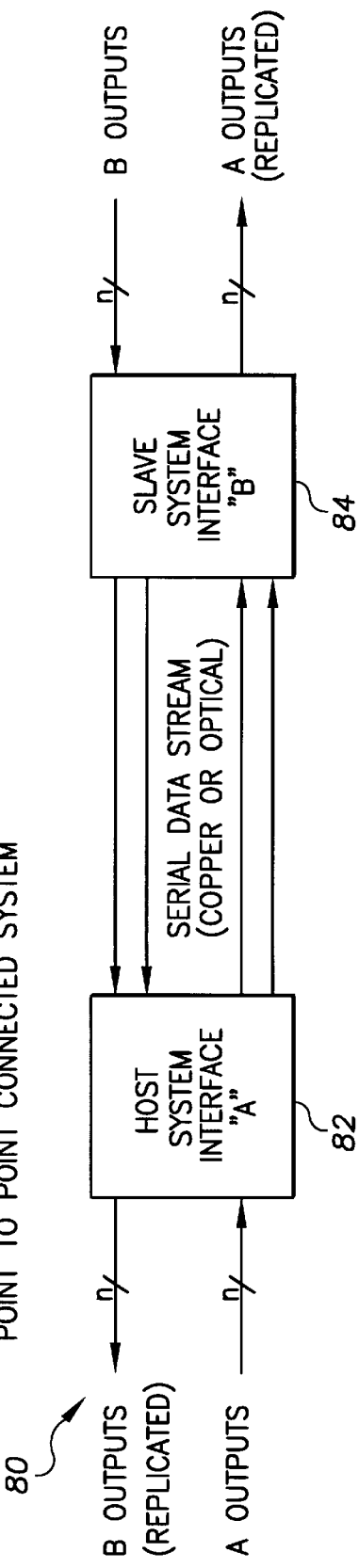
FIG.4  POINT TO POINT CONNECTED SYSTEM
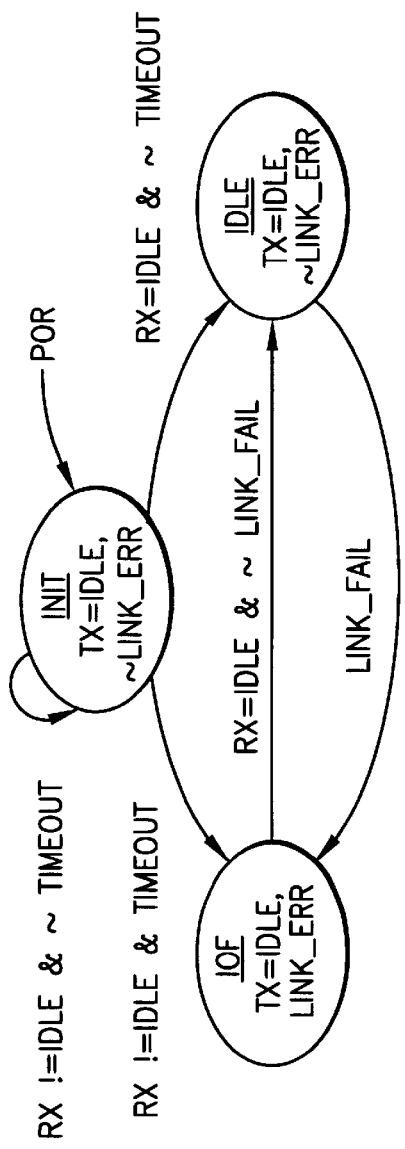
FIG.5  SERIAL INTERFACE PROTOCOL STATE DIAGRAM

POINT TO POINT OR RING CONNECTABLE BUS BRIDGE AND AN INTERFACE WITH METHOD FOR ENHANCING LINK PERFORMANCE IN A POINT TO POINT CONNECTABLE BUS BRIDGE SYSTEM USING THE FIBER CHANNEL

FIELD OF THE INVENTION

This invention relates generally to computer data links and, more specifically, to Fibre Channel and PCI bus based system interconnects.

BACKGROUND OF THE INVENTION

In computer systems, parallel buses such as the PCI (Personal Computer Interconnect) bus have been used to achieve high bandwidth connectivity between peripheral devices and processors and between multiple processors. In high speed data communications, serial interconnection schemes such as the Fibre Channel have been developed to produce high bandwidth within a single serial connection. These serial interconnection schemes have been used in computer systems, but have carried a cost of a unique interface requirement and a protocol that is incompatible with other peripheral devices. In addition, when they are tightly integrated into a computer system, the system controller circuits must be modified to use this connection, requiring custom components to be developed which raise the overall cost and complexity of the computer system.

The Fibre Channel has an overhead connected with link protocol and link recovery that is prohibitive when bandwidths are required which push the limit of the channel. The initialization times for a device can be on the order of milliseconds. This is a delay which is unnecessary when operating within a system where all devices are known or device information does not have to be polled every time a link failure occurs.

Within the realm of the parallel bus computer, interconnection is also a problem. Parallel bus interconnects require a high trace density on a circuit board, usually requiring a multitude of circuit board layers for both trace implementation and EMI (electromagnetic interference) and RFI (radio frequency interference) shielding. Serially connected buses reduce this requirement substantially but have produced an added cost of incompatibility with parallel connected components and have lower bandwidth than parallel connected buses.

Therefore a need existed to provide devices and methods for reducing interconnect signal line count by using a serially connected bus and to improve the operation of the existing serial buses such as the Fibre Channel so that the bandwidth can be improved to make this serial connection function as a practical alternative to existing parallel buses. A need also existed to provide connectivity to present buses such as the PCI bus, to maintain compatibility with present controllers and peripherals.

SUMMARY OF THE INVENTION

In accordance with one embodiment of the present invention, the present invention provides a distributed system that connects parallel peripheral buses using one or more serial connections.

The present invention further provides a method for increasing the efficiency of the Fibre Channel interface to allow higher throughput to make it useful for a serially connected bus.

Another aspect of the present invention provides a distributed system not only to connect peripheral buses to a host bus, but allow for interconnection to circuits which emulate a bus so that full implementation of the peripheral bus is not required for a particular host or slave.

In accordance with a more specific example embodiment of the present invention, a point to point or ring connectable bus bridge is implemented. The bus bridge is connected to a peripheral bus such as the PCI (Personal Computer Interconnect) bus and to a serial interface connection. A ring topology is formed so that each bus bridge in a system receives an input bus representation from the prior bus bridge in the system and drives the bus according to that representation. It also produces an output bus representation which represents the input representation received modified by the activity that was generated on the bus connected to that particular bus bridge.

A ring of this sort can also be driven by a non-bus bridge participant. A bus data generator and receiver can emulate the performance of all or part of the bus to simplify the connection to peripherals or hosts which do not require the full bus implementation to implement their resources in hardware.

The serial interface hardware used in this embodiment of the present invention is an industry standard interface known to those familiar with the art as the Fibre Channel. The Fibre Channel lacks sufficient throughput, at present, to practice the present invention as preferred. The state machine which drives the Fibre Channel physical layer is distinct from that of the standard Fibre Channel state machine and incompatible with devices which operate according to the Fibre Channel specification. This achieves the throughput to bridge buses operating at present bus speeds. Thus, this example embodiment uses the physical layer of the Fibre Channel but comprises a new protocol which improves the performance of the Fibre Channel physical layer in order to practice the present invention.

The foregoing and other objects, features, and advantages of the invention will be apparent from the following, more particular, description of the following embodiment examples of the invention, as illustrated in the accompanying drawings.

BRIEF DESCRIPTION OF THE DRAWINGS

FIG. 2 is a simplified block diagram of the point to point or ring connectable bus bridge.

FIG. 3 is a simplified block diagram of a bus bridge ring.

FIG. 4 is a simplified block diagram of a point to point connected system.

FIG. 5 is a state diagram of the serial interface protocol.

DETAILED DESCRIPTION

Figure 1:
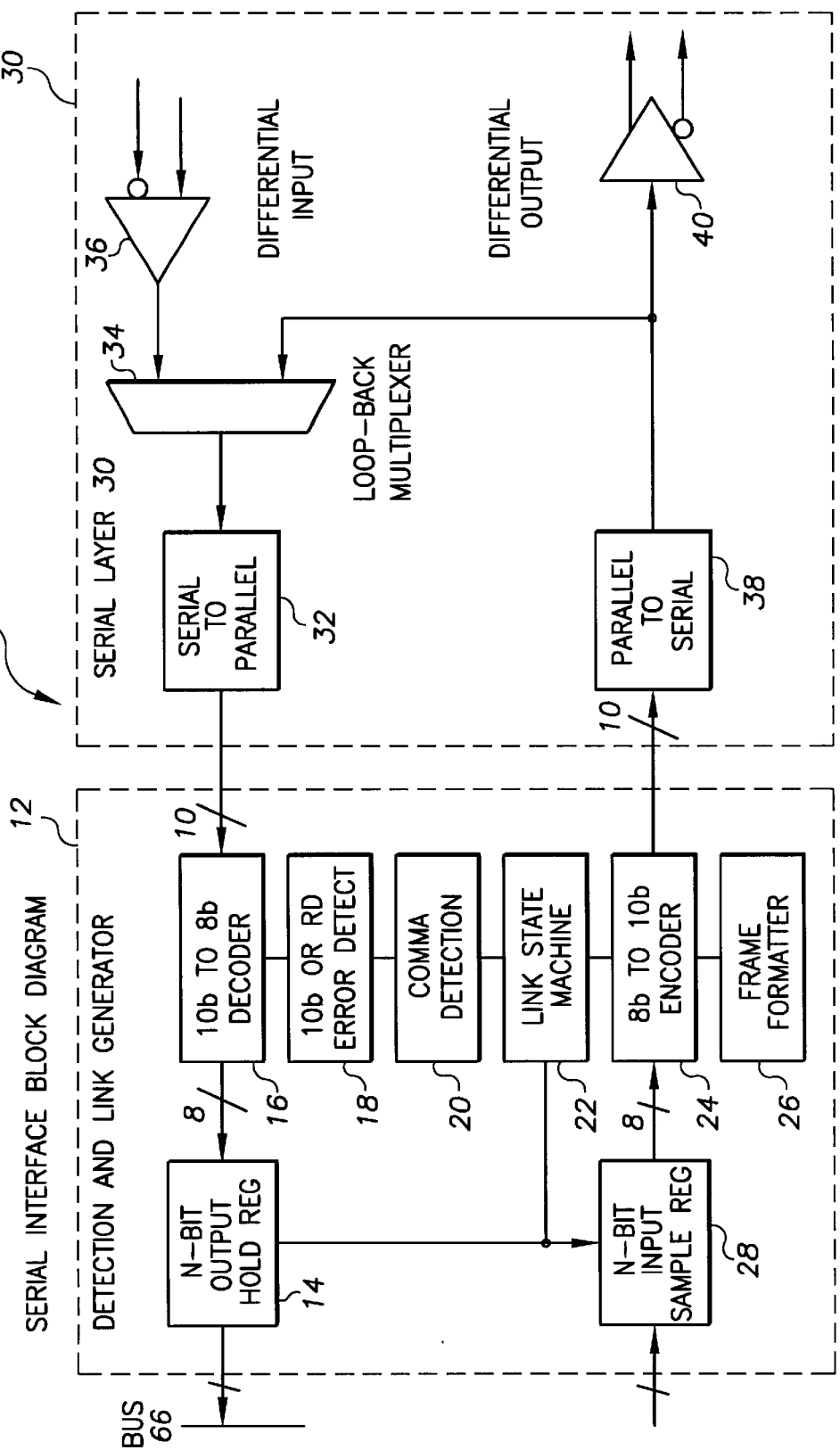
FIG. 1 is a simplified block diagram of the serial interface.

Referring to FIG. 1, a Serial Interface 10 for a Point to Point or Ring Connectable Bus Bridge 50 (FIG. 2) is shown. The Serial Interface 10 comprises an Error Detection and Link Generation block 12 and a Serial Layer 30. In a standard Fibre Channel interface, all of the elements present within these two blocks are also present. However, due to the simplification of the signalling protocol by the Link State Machine 22 using the method of the present invention shown in FIG. 5, the actual hardware which comprises the Fibre Channel hardware interface of the present invention may or may not support a full implementation of the Fibre Channel specification. This is not necessary to practice the present invention and may be desired or not on the part of the systems architect, depending on whether full protocol usage is desirable and whether the hardware can be simplified to reduce cost in an actual implementation.

The N-bit Output Hold Register 14 holds an input data representation and other control signals which are used by the Bus Bridge 50 (FIG. 2) to drive signals on the Bus 66 (FIG. 2). The N-bit Input Sample Register 28 samples signals from the Bus 66 (FIG. 2) and selects them for input to an Eight Bit to Ten Bit Encoder 24 (hereinafter Encoder). The information size is increased by this Encoder 24 to provide error detection and DC balance for the Interface 10. By adding two bits to the input data, multi-bit errors can be detected on decode back to eight bits by a receiver. DC balance creates an equal number of one's and zero's in the output data to make the DC value of the output signals maintain a constant long-term average value.

The Serial Interface 10 produces a digital signal that alternates in average polarity by two bits per frame between +1 and −1. This is known as a "running disparity" of one. The Frame Formatter 26 produces the control and timing signals to input a byte to the Encoder 24 and output a 10 bit word to the Serial Layer 30.

Within the Serial Layer 30, the Parallel to Serial Converter 38 converts the parallel word to a serial data stream which is output by the Differential Output 40. The Serial Layer 30 also contains a Differential Input 36 which receives a serial signal from the serial output of other Bus Bridges 50 (FIG. 2) or other serially connected devices and outputs it to the Loop Back Multiplexer 34. The Loop Back Multiplexer 34 is used to test the performance of the link by "looping back" the data stream without producing an output from the Differential Output 40. The Differential Input 36, when selected by the Loop Back Multiplexer 34, outputs serial data to the Serial to Parallel Converter 32 which produces a ten bit word input to the Error Detection and Link Generation block 12.

A Ten Bit to Eight Bit Data Decoder 16 reconstructs eight bits of data from the Ten Bit Input and the Ten Bit or RD Error Detection circuit 18 flags an error if the ten bit word represents a disallowed word (one that cannot occur without error in the protocol) or a running disparity error has occurred (the number of "one" bits minus the number of "zero" bits over time is not +/−1 at the word boundary).

The Comma Detection 20, produces frame synchronization for the Link State Machine 22. FIG. 5 shows a state diagram of the Link State Machine 22 operation. Referring now to FIG. 1 and FIG. 5, during initialization of the link, the Serial Interface 10 transmits Fibre Channel IDLE messages continuously and no data is transmitted from the N-bit Sample Register 28. The link stays in the initialization state until a device connected to the Differential Input 36 responds with an IDLE message or a timeout occurs. If an IDLE message is received, the link enters an idle state where data reception and transmission is enabled. If a timeout occurs, the link enters an INIT OR FAIL state (hereinafter IOF) in which no data is transmitted and an indication of failure is given to the Bus Bridge 50. If a device connected to the Differential Input 36, responds with an IDLE message while the link is in this state, the link will enter the idle state and data reception and transmission will be enabled. If the link fails in IDLE state, the link enters the IOF state.

The full Fibre Channel link specification calls for a more detailed protocol. In order to leave the initialization state prior to communication being established via IDLE signal reception, devices must send and respond to a lengthy sequence of handshaking messages. Without this sequence, the Fibre Channel will not leave its initialization state. In the present invention, the state machine does not perform this lengthy and complicated sequence. This allows the implementation of a faster startup and link recovery time which increases the throughput of the Fibre Channel physical layer. The need for the initialization handshaking is eliminated in the present invention by having prior knowledge of the devices connected to the Fibre Channel hardware. Thus, there is no need for the device initialization portion of the Fibre Channel protocol.

Referring to FIG. 2, a Point To Point or Ring Connectable Bus Bridge 50 is shown. A PCI Bus 66 is sampled by an Output Register 54 by the PCI Clock signal 67. The PCI Clock signal 67 can be supplied by the Bus 66, when the Bus 66 connection is to a host which is controlling the system, or by the Output Control Logic 58 for a Bus Bridge 50 which is a device connection.

A Serial Interface 10A supplies a bus input data representation to the Bus Bridge 50. This data representation contains the states of all signals on the bus that must be driven (inputs) and information about whether to drive and to what state for signals that may be driven (bidirectional signals). This allows the Bus Bridge 50 to completely simulate a bus to a connected device. The Input Register 56 stores the bytes as they come in through the Serial Interface 10A and when the input data set is complete, and at the appropriate time in the Bus 66 cycle, drives the output signals on the Bus 66 by enabling the Tri State Buffer 52. The Input Control Logic 58 either keeps the input data to the Bus 66 in sync with the Bus Clock 67 (for a host connection), or synchronizes the Bus 66 to the input data (for a slave connection) by driving the Bus Clock 67.

The Output Register 54, receives signals from the Bus 66, sampled by the Bus Clock 67 and presents them to a Selector 62. This Selector 62 is switched by an Output Logic Control 60. The Selector 62 will select either the input signals from the Input Register 56 or the output signals from the Output Register 54. This allows the Bus Bridge 50 to echo the input data representation to the Output Serial Interface 10B.

The only time the Selector 62 selects the Bus 66 inputs for presentation to the Multiplexer 64, is when a device connected to the Bus 66 is driving the Bus 66. This configuration allows a ring connected chain of Bus Bridges 50 (see FIG. 3) to circulate a bus data representation which completely describes the signals on the Bus 66, each individual Bus Bridge 50 sampling its Bus 66 via the Output Register 54 when a resource on that particular Bus 66 is being accessed.

The data is modified or not by each Bus Bridge 50, depending on whether a resource on the Bus 66 is participating in the bus protocol at the particular time. This allows each of the other Bus Bridges 50 in the ring to have information regarding the complete state of the Bus 66, causing the system to act at each Bus 66 as if all Buses 66 were connected physically except for a delay introduced by the communication of Bus 66 state information.

The Multiplexer 64 selects groups of signals from the Selector 62 for presentation to the Output Serial Interface 10B. This is input to the N-bit Input Sample Register 28 (FIG. 1) in the Serial Interface 10B. The output word size of the Multiplexer 64 is the same as the input word size of the N-bit Sample Register 28 (FIG. 1). When the Bus Bridge 50 is used with the Serial Interface 10, N is set to 8. The Output Logic Control 60 selects the individual 8-bit words by controlling the Multiplexer 64. As described, the Bus Bridge 50 represents a way to completely sample and control the state of the Bus 66 via a serial input and output connection. The Bus Clock 67 can either be driven to the Bus 66 for a device connection, or received from the Bus 66 for a host connection. Under normal circumstances, there will only be one Bus Bridge 50 connected in the serial ring (see FIG. 3) which receives a Bus Clock 67 from the Bus 66. It is possible that the Clock 67 could be sourced by another means which produces an input and output data representation. On the ring (see FIG. 3), the Bus Clock 67 of all the Bus Bridges 50 is merely a signal decoded from or encoded in the timing of the data representation transmissions.

The following table shows the treatment of the PCI Bus 66 signals in the data representation for a device connected to the Bus Bridge 50. The table shows whether the signal is output to the bus, input from the bus and modified in the data representation, and whether the value in the input data representation is forwarded (copied) to the output data representation.

| PCI Signal | Direction | Output (to bus) | Input (from bus) | Forwarded (echoed by Serial Interface) |
|---|---|---|---|---|
| AD[31:0] | Both | If not ADREAD | Yes | If not ADREAD |
| C/BE[3:0]# | Both | If not ADREAD | Yes | If not ADREAD |
| PAR | Both | If not ADREAD | Yes | If not ADREAD |
| FRAME# | Both | If not MASTER | Yes | If not MASTER |
| TRDY# | Both | If MASTER | Yes | If not TARGET |
| IRDY# | Both | If not MASTER | Yes | If not MASTER |
| STOP# | Both | If MASTER | Yes | If not TARGET |
| DEVSEL# | Both | If MASTER | Yes | If not TARGET |
| IDSEL | Output | Yes | No | No |
| PERR# | Both | Yes | Yes | Yes |
| SERR# | Both | Yes | Yes | Yes |
| INT[A:D]# | Input | No | Yes | Yes |
| REQ# | Input | No | Yes | No |
| GNT# | Output | Yes | No | No |
| REQ# from other bus | n/a | No | No | Yes |
| GNT# from other bus | n/a | No | No | Yes |
| RST# | Output | Yes | No | Yes |
| CLK | Output | Yes (derived from packet timing) | No | No |

There are three internal signals that control the behavior of the bidirectional signals: MASTER, TARGET, and ADREAD. These three signals determine when bidirectional signals are being driven by the PCI device or by another device connected in the ring or point to point connected system. These three control signals are generated by the Bus Bridge 50 as follows: the assertion of the MASTER signal is coincident with the assertion of FRAME# by the PCI device (when FRAME# is asserted but is not being driven by the Tri State Buffer 52.) The de-assertion of the master signal is coincident with the de-assertion of the logical OR of DEVSEL#, TRDY# and STOP#. The assertion of the ADREAD signal is coincident with the de-assertion of IRDY#, when GNT# is false or in response to the de-assertion of GNT# when FRAME# and IRDY# are false. The assertion of the TARGET signal is coincident with DEVSEL# and the de-assertion is coincident with the assertion of FRAME# when the device is a master and coincident with the assertion of DEVSEL# when the device is a target.

As shown in the table, there are 49 PCI signals that are inputs to the Output Register 54. One signal REQ# is always transmitted since it represents a direct input to the particular Bus Bridge 50 which arbitrates bus ownership for the entire system (central arbiter resource). The two error signals, PERR# and SERR#, along with the four interrupt signals INT[A:D] are logically OR'ed with their corresponding received bits and the result is always transmitted. This supports the sharing of the error and interrupt signals. The remaining 42 signals are conditionally transmitted from the device or forwarded from the received input data representation.

Of these 42 signals, FRAME# and IRDY# are used by the current master to initiate data transfers. They are forwarded except when the device is a master and the Bus Bridge 50 inputs are transmitted. Three signals: DEVSEL#, TRDY# and STOP# are used by the current target to control the target's response to the initiator of the data transfer. They are forwarded except when the device is a target and the Bus Bridge inputs are transmitted.

The 37 data signals, AD[31:0], C/BE[3:0]#, and PAR are used to transfer data in a bidirectional manner for both initiators and targets. These signals are forwarded except when the device is a master and it is sending an address or writing data to a target or when the device is a target and it is returning read data to the master. The Bus Bridge 50 inputs are transmitted when the ADREAD signal is asserted.

There are 5 PCI Bus 66 signals that are always outputs from the Tri State Buffer 52. IDSEL# and GNT# are signals provided by the central resource to each device. RST# is a broadcast signal from the central resource to all devices. SERR# is an open drain output that is only driven active, and may be asserted due to an assertion in the data representation, or an error in Serial Interface 10A or 10B. PERR# is a tri-state signal which is driven only when active and for one clock after its de-assertion.

Additionally, there are 42 output signals from the Input Register 56 which are entered in the data representation only when the particular Bus 66 is in a state where these signals are output to the bus.

Two signals, FRAMES and IRDY# are used by the current master to initiate data transfers. They are driven to the device's Bus 66 except when the device is a master, at which time they are tri-stated. Three signals, DEVSEL#, TRDY# and STOP# are used by the current target to control the target's response to the initiator of the data transfer. They are tri-stated except when the PCI device is a master, when they are driven to the master's Bus 66. The 37 data signals, AD[31:0], C/BE[3:0]# and PAR, are used to transfer data in a bidirectional manner for both initiators and targets. These signals are driven except when the device is a master and it is sending an address or writing data to a target, or when the device is a target and it is returning data to a master. The Tri State Buffer 52 is disabled when the ADREAD signal is asserted.

The following table shows the treatment of the PCI Bus 66 signals in the data representation for the central resource Bus Bridge 50. The table shows whether the signal is output to the bus, input from the bus and modified in the data representation, and whether the value in the input data representation is forwarded (copied) to the output data representation.

| PCI Signal | Direction | Output (to bus) | Input (from bus) | Forwarded (echoed by Serial Interface) |
|---|---|---|---|---|
| AD[31:0] | Both | If not ADREAD | Yes | If not ADREAD |
| C/BE[3:0]# | Both | If not ADREAD | Yes | If not ADREAD |
| PAR | Both | If not ADREAD | Yes | If not ADREAD |
| FRAME# | Both | If not MASTER | Yes | If not MASTER |
| TRDY# | Both | If MASTER | Yes | If not TARGET |
| IRDY# | Both | If not MASTER | Yes | If not MASTER |
| STOP# | Both | If MASTER | Yes | If not TARGET |
| DEVSEL# | Both | If MASTER | Yes | If not TARGET |
| IDSEL | Input | No | Yes | No |
| PERR# | Both | Yes | Yes | Yes |
| SERR# | Both | Yes | Yes | Yes |
| INT[A:D]# | Output | Yes | No | No |
| REQ[2:0]# | Output | Yes | No | No |
| GNT[2:0]# | Input | No | Yes | No |
| RST# | Input | No | Yes | No |
| CLK | Output | Yes (derived from packet timing) | No | No |

The central resource Bus Bridge 50 is the Bus Bridge 50 in a connected system which is responsible for the arbitration of resources on the point to point or ring connected bus system. The central resource Bus Bridge 50 also generates packets, clocks and the reset signal. Furthermore, it is the destination for all interrupts and system errors.

The above table shows that the direction of the unidirectional signals is reversed from that of the previous table which was for a device connection. These connections operate in a similar manner to the device connection, but the REQ#[2:0]# signals are always received, since the central resource receives all bus requests, and the INT[A:D]# signals are open drain outputs which are only driven active, since the central resource does not generate interrupts, but responds to them. IDSEL[2:0], GNT[2:0]# and RST# are only inputs from the bus to the Bus Bridge 50. The central resource is the generator of the setup, bus grant and reset states and thus generates these signals.

Referring to FIG. 3, a Ring Topology 70 for a connection of four Bus Bridges 50 is shown. Device Interfaces 72A, 72B and 72C connect to devices. Central Resource Interface 74 connects to a host. The serial connections to the Serial Interfaces 28A, 28B, 28C and 28D in each of the Bus Bridges 50, are connected in a daisy chain. The output of each Serial Interface 30 (FIG. 1) inputs the input of the next Interface 30 (FIG. 1) in the chain and so forth. This allows the sum of the input and output data representations of the Bus 66 from each of the Bus Bridges 50 to be unified to completely describe the Bus 66.

FIG. 4 shows a generic Point to Point Connection 80 with a Host 82 and a Slave 84 interface. This topology allows for remote serial connection of any set of parallel connections, provided the data rate of the serial connections is sufficient to adequately represent the inputs and outputs of the Interfaces 82 and 84. A key feature of this type of interface is that the frame rate of the interconnecting serial streams between Interfaces 82 and 84 do not require the same frame rate for transmit and receive. The only requirement is that the frame rate be high enough to support the update of the outputs on each Interface 82 and 84. This allows optimized transfer rates for implementations where the parallel data width for Host System Interface 82 is different from the width for the Slave System Interface 84.

Referring to FIG. 5, a state diagram of the method for enhancing the link performance of the Fibre Channel hardware interface is shown. The link has three states: an INIT state for initialization, an IDLE state for reception and transmission of data and the IOF state for error recovery.

When the link is started, the INIT state is entered. In this state, data reception is disabled and the link transmits an IDLE message continuously. The link remains in this state until an IDLE message is received from the interface, or a timeout occurs. If the IDLE message is received, the link is considered to be operational and the state machine enters the IDLE state where transmission and reception of data is enabled.

If a timeout occurs, the link enters the IOF state where data transmission and reception is disabled and the link transmits IDLE messages and waits for an IDLE message to be received. If the IDLE message is received, the link returns to the IDLE state. If a data error occurs while the link is in the IDLE state, it will enter the IOF state, disabling further data transmission or reception until an IDLE message is received. This is the mechanism for link recovery in this method for enhancing link performance.

The operation of this link is distinguished from the operation of a standard Fibre Channel link by its simplicity. A standard Fibre Channel link state machine exchanges a series of initialization messages with from the devices connected to the chain.

In the present invention, information about the devices is already known, so the devices do not implement a complicated initialization sequence. This makes this implementation of a state machine for the Fibre Channel hardware interface incompatible with and distinct from the standard Fibre Channel interface. A standard Fibre Channel connection to this link will never leave the initialization state as the initialization sequence is not supported. As initialization and error recovery on a standard Fibre Channel can take several milliseconds, the performance of this link which could recover on the order of tens of nanoseconds is preferred. Since the link data rates are presently less than one nanosecond per bit and an IDLE message requires thirty-two bits to complete, sixty-four nanoseconds for a transmit IDLE to receive IDLE cycle is conceivable.

The data representations transmitted between Bus Bridges 50 in a system have bits in each frame transmitted on the link, except for the clock signal. The clock signal is derived from the timing of the frame received by a particular Bus Bridge 50. With one central resource and three devices, three REQ# and three GNT# bits must be supported with 50 other PCI signals for a total of 56 bits. These 56 bits can be represented in two 32 bit words, which when added to a start of frame (SOFn3) and end of frame (EOFn) word, make a minimum 4 word frame. When bursting, the 56 bits are repeated until the burst completes and the last word is filled with as many zero bits as are required to make up a full 32 bit word. The frame then ends with EOFn. When the PCI bus segments are idle, the bus states must still be circulated so that bus requests, interrupts and errors can be communicated. The packets, or 56 bit burst elements, are delayed by one byte at each node to allow the merging of the data representation being received with the data generated from activity at that node.

When the PCI bus is busy with a data transfer between two participating devices, PCI clock to PCI clock timing is critical and PCI clock latencies cannot be tolerated. The transmittal of a 56 bit burst element should be delayed until the effects of the previous received burst element on the PCI bus have been propagated and have produced their results on the respective device and central resource buses. At 33 Mhz, the clock period is 30 nanosec and a time interval of at least 30 nanosec must be inserted between burst elements.

Figure 6:
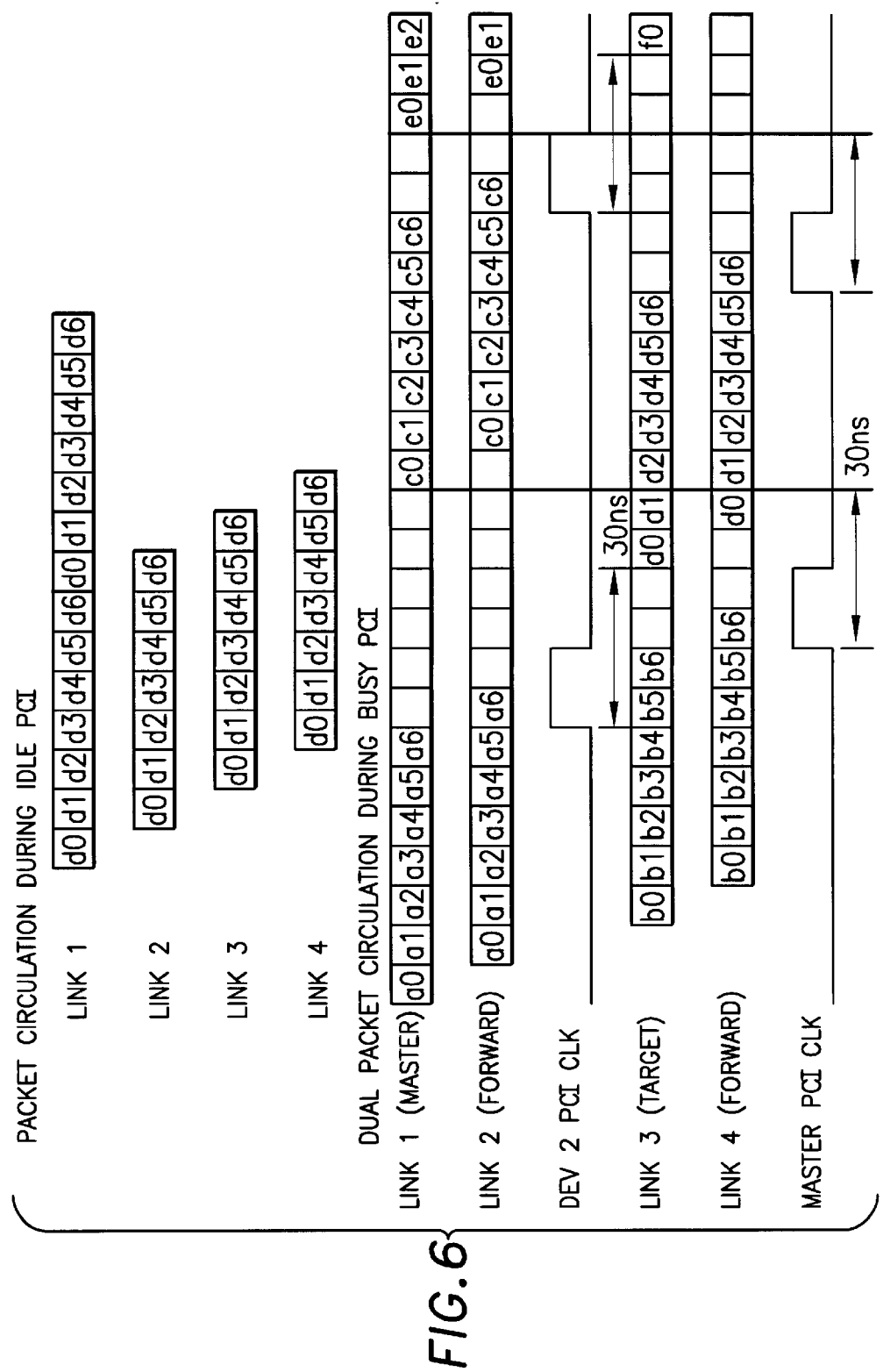
FIG. 6 is timing diagram showing packet transfers on the bus bridge ring.

FIG. 6 shows the timing of the data representation transmissions in the bus bridge ring topology 70 (FIG. 3). Referring to FIG. 6 and FIG. 3, the operation of a ring connected system 70 can be shown. While all buses are idle, the state of the bus 66 (FIG. 2) is echoed around the ring in burst transmissions. Each byte from each node 74, 72A, 72B and 72C is echoed to the next node, modified by any bus state changes on that node's bus 66 (FIG. 2), and there is a delay of one byte worth of information between each of the nodes 74, 72A, 72B and 72C.

To ensure synchronization between all bridges, the current master may limit the burst size of the idle frames to a reasonable value such as four packets. On the PCI bus 66 (FIG. 2) with fifty bus lines plus a REQ and GNT line for each bus 66 (FIG. 2), a three device system would require fifty-six bits to represent. This can be accomplished in seven bytes as shown in FIG. 6.

By organizing the packet bit order so that the end of the packet contains non-critical signals such as bus request and bus grant signals, the bus clock may start before the reception of the entire input data representation is complete. In this example, the bus request and bus acknowledge signals are represented in the last byte.

The bottom of FIG. 6 shows the relationship of the PCI bus clock 67 (FIG. 2) to the transmission and reception of the output and input data representations. Different letters represent different packets of a multi-packet frame and the numbers indicate the byte within a packet. Because the entire state of the bus 66, excluding the non-critical signals, must be known before the next bus cycle is entered (the results of the last cycle must be presented to all nodes), the PCI bus clock 67 (FIG. 2) must be delayed until data at that bus 66 (FIG. 2) is valid. The diagram shows a transfer between the central resource master interface 74, and a device target interface 72B with both busses 66 implementing a 33 Mhz clock with a 30 nanosecond period. In FIG. 3, link 1 is on the left, link 2 is on the bottom, link 3 is on the right, and link 4 is on the top.

Since the last byte (d6) of the data comprises non-critical signals that represent direct connections between the central resource and each device (REQ#, GNT# and IDSEL#), the interval for the buses to react may begin with the start of the last byte. The next d0 byte will begin nanosec later in a 33 Mhz system. At 1.06 Ghz for the Fibre Channel physical layer, this is equivalent to 31.875 link bit times, and at 1.25 Ghz this is 37.5 link bit times. These bit times must be rounded up to four 10-bit times which results in a maximum link rate of 1.33 Ghz for the example given. If the four byte times are started with the d6 byte, and the retransmitted bytes are delayed by a single byte, as discussed above, then two additional dummy bytes must be inserted to yield a minimum 9 byte burst element, as shown by the link 3 (target) transmission of burst elements b and d.

The master must now wait for burst element b from the target plus the 30 nanosec response time before it can transmit the second burst element c. To accommodate this delay, there are six dummy bytes that are inserted between the transmission of burst elements a and c. Following the transmission of burst element c, burst element d from the target is received. An insertion of two dummy bytes between burst elements c and e is required, as discussed above. The cyclic nature of inserting six and then two bytes is maintained throughout the burst, which leads to an average of four dummy bytes per burst. This results in an average burst element size of 11 bytes.

The bandwidth can be further optimized by implementing a loop bypass capability. If the Input Serial Interface 10A and Output Serial Interface 10B (FIG. 2) are directly connected for non-participating nodes, 10 link bit periods can be saved. This optimization cannot be realized for participating nodes, since the participating nodes must still implement a four byte delay for the PCI bus response time. In the given example, there are two non-participating nodes, which would result in an average burst element size of 10 bytes. When using a loop bypass, the non-participating nodes, although able to monitor the loop, would be unable to merge such data as master requests, interrupt requests or system errors. These signals would have to be held until the next idle PCI frame. The need for idle PCI frames imposes a requirement that at the end of every burst of data, at least one idle PCI frame must be transmitted by the master.

The ring topology is exploited to provide two active data transmissions in parallel. Both the master and the target transmit current burst elements at the same time. All of the other Bus Bridges 50 are not participating and are therefore in a bypass mode, although they are monitoring the state of the loop and generating PCI cycles for their associated PCI devices. This scheme allows minimal latencies from the start of a transmission at a participating node and the arrival of that bit at the receiving node, which can be reduced to a single transmit clock per node of the ring.

The clock generation is also diagrammed in FIG. 6. The rising edge of the clock is generated at the end of the d byte (marked as a and b). Two byte times later, the falling edge of the clock is generated. This guarantees the minimum 33 Mhz PCI clock high time for link rates up to 1.25 Ghz. The output state of the PCI bus is captured in the Output Register 54 (FIG. 2) four byte times after the rising edge of the PCI clock. This guarantees the minimum 33 Mhz clock period for link rates up to 1.25 Ghz. In the case of a 4-word, non-burst frame, the clock generation occurs during the four byte times of the EOFn primitive sequence.

Multiple serial links may be combined in parallel to increase the bandwidth of the PCI subsystem. When two serial links are combined in parallel, the 56 bit to 8 bit conversion becomes a 64 to 16 bit conversion, with 8 pad bits added to realize an even number of 16 bit words. This configuration has two implications: each link must still follow the link rules and therefore the state machine primitives must be generated on each link; and the generated PCI clock must be a combination of the two generated PCI clocks such that the resulting clock's rising edge is never earlier than either of the two source clocks. This can be accomplished by a logical AND of the two clocks.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A point to point connectable bus bridge comprising:
   a bus;
   at least one serial interface;
   a bus interpreter coupled to said at least one serial interface and further coupled to a set of signals on said bus for encoding said set of signals to an output data representation for transmission over said at least one serial interface;

a bus driver coupled to said at least one serial interface and further coupled to said bus for receiving an input data representation from said at least one serial interface and decoding it to drive a second set of signals on said bus; and a clock buffer coupled to said bus for synchronizing said input data representation and said output data representation with said bus wherein said at least one serial interface uses a method for communication with at least one device comprising the steps of:

starting at an initialization state wherein idle messages are transmitted and data transfer is disabled;

waiting in said initialization state until one of a timeout occurs or a device response is received;

proceeding to the operational states without waiting for a further response from said at least one device;

entering one of an idle state when said device response was received wherein data transmission is enabled or a fail state when said timeout has occurred wherein data transmission is disabled; and entering said idle state if said fail state was entered and an idle response is received from said device.

2. The point to point connectable bus bridge in accordance with claim 1 wherein said bus is a PCI bus.

3. A point to point connectable bus bridge comprising:

a bus;

at least one serial interface;

a bus interpreter coupled to said at least one serial interface and further coupled to a set of signals on said bus for encoding said set of signals to an output data representation for transmission over said at least one serial interface;

a bus driver coupled to said at least one serial interface and further coupled to said bus for receiving an input data representation from said at least one serial interface and decoding it to drive a second set of signals on said bus; and a clock buffer coupled to said bus for synchronizing said input data representation and said output data representation with said bus wherein said at least one serial interface uses a method for link recovery when connected to at least one device comprising the steps of:

entering an init-or-fail state wherein idle messages are transmitted and data transfer is disabled when a link error is detected;

waiting in said init-or-fail state until a device response is received; and proceeding to the operational states without waiting for a further response from said at least one device.

4. A point to point connectable bus bridge comprising:

a bus;

at least one Fibre Channel physical layer interface;

a bus interpreter coupled to said at least one interface and further coupled to a set of signals on said bus for encoding said set of signals to an output data representation for transmission over said at least one interface;

a bus driver coupled to said at least one interface and further coupled to said bus for receiving an input data representation from said at least one interface and decoding it to drive a second set of signals on said bus; and a clock buffer coupled to said bus for synchronizing said input data representation and said output data representation with said bus, wherein the clock buffer includes a clock receiver for synchronizing the output data representation with the bus; and wherein said Fibre Channel physical layer interface uses a method for communication with at least one device comprising the steps of:

starting at an initialization state wherein idle messages are transmitted and data transfer is disabled;

waiting in said initialization state until one of a timeout occurs or a device response is received;

proceeding to the operational states without waiting for a further response from said at least one device;

entering one of an idle state when said device response was received wherein data transmission is enabled or a fail state when said timeout has occurred wherein data transmission is disabled; and entering said idle state if said fail state was entered and an idle response is received from said device.

5. A point to point connectable bus bridge comprising:

a bus;

at least one Fibre Channel physical layer interface;

a bus interpreter coupled to said at least one interface and further coupled to a set of signals on said bus for encoding said set of signals to an output data representation for transmission over said at least one interface;

a bus driver coupled to said at least one interface and further coupled to said bus for receiving an input data representation from said at least one interface and decoding it to drive a second set of signals on said bus; and a clock buffer coupled to said bus for synchronizing said input data representation and said output data representation with said bus, wherein the clock buffer includes a clock receiver for synchronizing the output data representation with the bus; and wherein said Fibre Channel physical layer interface uses a method for link recovery when connected to at least one device comprising the steps of:

entering an init-or-fail state wherein idle messages are transmitted and data transfer is disabled when a link error is detected;

waiting in said init-or-fail state until a device response is received; and proceeding to the operational states without waiting for a further response from said at least one device.

6. The point to point connectable bus bridge in accordance with claim 4 wherein said bus is a PCI bus.

7. A method for communication with at least one device over a Fibre Channel physical layer interface comprising the steps of:

starting at an initialization state wherein idle messages are transmitted and data transfer is disabled;

waiting in said initialization state until one of a timeout occurs or a device response is received;

proceeding to the operational states without waiting for a further response from said at least one device;

entering one of an idle state when said device response was received wherein data transmission is enabled or a fail state when said timeout has occurred wherein data transmission is disabled; and entering said idle state if said fail state was entered and an idle response is received from said device.

8. A method for link recovery while communicating with at least one device over a Fibre Channel physical layer interface comprising the steps of:
   entering an init-or-fail state wherein idle messages are transmitted and data transfer is disabled when a link error is detected;
   waiting in said init-or-fail state until a device response is received; and
   proceeding to the operational states without waiting for a further response from said at least one device.

9. A distributed bus system comprising, in combination:
   a bus data generator for creating a first output data representation;
   a bus data receiver for receiving a first input data representation;
   at least one first serial interface coupled to said bus data generator and further coupled to said bus data receiver for transmitting said first output data representation and receiving said first input data representation;
   at least one point to point connectable bus bridge for interfacing peripherals to said system comprising, in combination:
      a bus;
      at least one second serial interface coupled to said first serial interface for receiving a second input data representation and transmitting a second output data representation;
      a bus interpreter coupled to said at least one second serial interface and further coupled to a first set of signals on said bus for encoding said first set of signals to said second output bus data representation for transmission over said at least one second serial interface;
      a bus driver coupled to said at least one second serial interface and further coupled to said bus for receiving said second input data representation from said at least one second serial interface and decoding it to drive a second set of signals on said bus; and
      a clock buffer comprising a clock driver for synchronizing said bus with said second input data representation.

10. The distributed bus system in accordance with claim 9 wherein said first serial interface and said second serial interface are Fibre Channel physical layer interfaces.

11. The distributed bus system in accordance with claim 10 wherein said Fibre Channel physical layer interfaces use a method for communication with at least one device comprising the steps of:
   starting at an initialization state wherein an idle message is transmitted and data transfer is disabled;
   waiting in said initialization state until one of a timeout occurs or a device response is received;
   proceeding to the operational states without waiting for a further response from said at least one device;
   entering one of an idle state when said device response was received wherein data transmission is enabled or a fail state when said timeout has occurred wherein data transmission is disabled; and
   entering said idle state if said fail state was entered and an idle response is received from said device.

12. The distributed bus system in accordance with claim 10 wherein said Fibre Channel physical layer interfaces use a method for link recovery while communicating with at least one device over a Fibre Channel physical layer interface comprising the steps of:
   entering an init-or-fail state wherein idle messages are transmitted and data transfer is disabled when a link error is detected;
   waiting in said init-or-fail state until a device response is received; and
   proceeding to the operational states without waiting for a further response from said at least one device.

13. A distributed bus system comprising a point to point connectable bus bridge for interfacing said system to a CPU said point to point connectable bus bridge comprising, in combination:
   a bus;
   at least one first serial interface;
   a bus interpreter coupled to said at least one first serial interface and further coupled to a set of signals on said bus for encoding said set of signals to an output data representation for transmission over said at least one serial interface;
   a bus driver coupled to said at least one serial interface and further coupled to said bus for receiving an input data representation from said at least one serial interface and decoding it to drive a second set of signals on said bus;
   a clock buffer coupled to said bus comprising a clock receiver for synchronizing said bus with said input data representation; and
   at least one point to point connectable bus bridge for interfacing peripherals to said system comprising, in combination:
      a second bus;
      at least one second serial interface coupled to said first serial interface for linking said first bus to said second bus;
      a second bus interpreter coupled to said at least one second serial interface and further coupled to a third set of signals on said second bus for encoding said third set of signals to a second output bus data representation for transmission over said at least one second serial interface;
      a second bus driver coupled to said at least one second serial interface and further coupled to said second bus for receiving a second input data representation from said at least one second serial interface and decoding it to drive a fourth set of signals on said second bus; and
      a clock buffer comprising a clock driver for synchronizing said second output data representation with said second bus.

14. The distributed bus system in accordance with claim 13 wherein said first serial interface and said second serial interface are Fibre Channel physical layer interfaces.

15. The distributed bus system in accordance with claim 14 wherein said Fibre Channel physical layer interface and said second Fibre Channel physical layer interface use a method for communication with at least one device comprising the steps of:
   starting at an initialization state wherein an idle message is transmitted and data transfer is disabled;
   waiting in said initialization state until one of a timeout occurs or a device response is received;
   proceeding to the operational states without waiting for a further response from said at least one device;
   entering one of an idle state when said device response was received wherein data transmission is enabled or a fail state when said timeout has occurred wherein data transmission is disabled; and
   entering said idle state if said fail state was entered and an idle response is received from said device.

16. The distributed bus system in accordance with claim 14 wherein said Fibre Channel physical layer interfaces use a method for link recovery while communicating with at least one device over a Fibre Channel physical layer interface comprising the steps of:

entering an init-or-fail state wherein idle messages are transmitted and data transfer is disabled when a link error is detected;

waiting in said init-or-fail state until a device response is received; and proceeding to the operational states without waiting for a further response from said at least one device.

17. The distributed bus system in accordance with claim 15 wherein said bus and said second bus are PCI buses.

\* \* \* \* \*

UNITED STATES PATENT AND TRADEMARK OFFICE
CERTIFICATE OF CORRECTION

PATENT NO. : 6,260,092 B1
DATED : July 10, 2001
INVENTOR(S) : Story et al.

It is certified that error appears in the above-identified patent and that said Letters Patent is hereby corrected as shown below:

<u>Title page,</u>
Item [54[, the title should read "POINT TO POINT OR RING CONNECTABLE BUS BRIDGE AND AN INTERFACE WITH METHOD FOR ENHANCING LINK PERFORMANCE IN A POINT TO POINT CONNECTABLE BUS BRIDGE SYSTEM USING THE FIBRE CHANNEL".

<u>Column 1,</u>
Line 6, "FIBER" should read -- FIBRE --.

Signed and Sealed this

Eleventh Day of June, 2002

*Attest:*

*Attesting Officer*

JAMES E. ROGAN
*Director of the United States Patent and Trademark Office*